(12) United States Patent
E et al.

(10) Patent No.: US 12,266,929 B2
(45) Date of Patent: Apr. 1, 2025

(54) DATA ACQUISITION AND CONTROL SYSTEM OF PULSED POWER SUPPLY FOR MULTI-LOAD

(71) Applicant: HARBIN INSTITUTE OF TECHNOLOGY, Harbin (CN)

(72) Inventors: Peng E, Harbin (CN); Jian Guan, Harbin (CN); Xun Ma, Harbin (CN); Hongtao Li, Harbin (CN); Weijun Deng, Harbin (CN); Mingjun Ding, Harbin (CN); Chuanhui Kang, Harbin (CN); Songjie Li, Harbin (CN); Jinshui Xiao, Harbin (CN); Juan Zhao, Harbin (CN); Jie Wan, Harbin (CN); Li Tan, Harbin (CN); Liyi Li, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 17/911,113

(22) PCT Filed: Jun. 21, 2022

(86) PCT No.: PCT/CN2022/100004
§ 371 (c)(1),
(2) Date: Sep. 12, 2022

(87) PCT Pub. No.: WO2023/082643
PCT Pub. Date: May 19, 2023

(65) Prior Publication Data
US 2023/0411993 A1    Dec. 21, 2023

(30) Foreign Application Priority Data
Nov. 12, 2021  (CN) .......................... 202111340917.2

(51) Int. Cl.
*G06F 30/00*    (2020.01)
*H02J 13/00*    (2006.01)
*B64G 7/00*    (2006.01)

(52) U.S. Cl.
CPC .. *H02J 13/00001* (2020.01); *H02J 13/00017* (2020.01); *B64G 2007/005* (2013.01)

(58) Field of Classification Search
CPC ............................................... H02J 13/00001
See application file for complete search history.

(56) References Cited

U.S. PATENT DOCUMENTS

2016/0231367 A1*  8/2016  Cox ................... G01R 29/0814
2016/0309352 A1* 10/2016  Yuan ................. H02J 13/00034

FOREIGN PATENT DOCUMENTS

CN           113484593         * 10/2021

OTHER PUBLICATIONS

Translation of the Written Opinion of the International Searching Authority for PCT/CN2022/100004 Aug. 26, 2022.*

* cited by examiner

*Primary Examiner* — Phuong Huynh
(74) *Attorney, Agent, or Firm* — Lathrop GPM LLP (57) ABSTRACT

The present disclosure provides a data acquisition and control system of pulsed power supply for multi-load, and relates to the technical field of pulsed power. The system of the present disclosure is configured to control 18 sets of pulsed power supplies to provide 18 coils with stable and reliable excitation current featuring multiple output time sequences and flexible adjustability, such that a near-earth space plasma environment ground-based simulation device can simulate the magnetic field topology of the earth magnetosphere and realize a background magnetic field required by physical experiments. The system mainly achieves the following functions: control over charge and discharge of (Continued)

pulsed power supplies, selection of power supplies put in use, "delay trigger" setting, voltage monitoring, status monitoring of key components and output current display; and it is also necessary to realize failure alarm and failure handling for the purpose of ensuring the safety of equipment and personnel.

4 Claims, 9 Drawing Sheets

DATA ACQUISITION AND CONTROL SYSTEM OF PULSED POWER SUPPLY FOR MULTI-LOAD

CROSS REFERENCE TO RELATED APPLICATION

This present application claims priority to the Chinese Patent Application 202111340917.2, filed with National Intellectual Property Administration, PRC on Friday, Nov. 12, 2021, and entitled "DATA ACQUISITION AND CONTROL SYSTEM OF PULSED POWER SUPPLY FOR MULTI-LOAD", which is incorporated herein by reference in its entirety.

TECHNICAL FIELD

The present disclosure relates to the technical field of pulsed power, and in particular to a data acquisition and control system of pulsed power supply for data acquisition and control system of pulsed power supply for multi-load.

BACKGROUND ART

The spherical shell-shaped region about 100-36000 km from the earth surface is called near-earth space, where a considerable quantity of ionized gases are ionized, and move under the guidance and control of geomagnetic field. The geomagnetic field is closely involved in the coupling and transfer of energy and momentum in the sun and the earth's space environment through the interaction with the magnetized solar wind. The most basic and central part is the earth magnetosphere, where the active areas of most spacecrafts and windows for deep space exploration are located. Therefore, the study of the basic physical process of the space plasma in the earth magnetosphere and the characteristics and explosive physical processes of the extreme space plasma environment not only provide a theoretical guidance for the design and safe operation of spacecrafts, but also deepens the understanding of the space plasma environment as well as disastrous space environment such as magnetic storms and high-energy particle storms, thus improving the high-energy particle radiation belt model.

Study methods for the space plasma environment in the earth magnetosphere generally include satellite sounding, ground-based observation, ground-based simulation environments and numerical simulation calculation. Satellite sounding is the most direct research tool. After a large number of satellite observations over the years, people have made great achievements in the study of space plasma environment and its physical processes. Nevertheless, there are some shortcomings in satellite sounding, such as single observation point, limited orbit, long observation period, accidental observation data and so on. As a result, simply using satellite sounding to study the space plasma environment in the earth magnetosphere has certain limits. The climate environment of the earth atmosphere may potentially deviate the ground observation results. In addition, due to the limitations of theory, model, numerical value, program and so on, it is impossible to accurately reflect the real physical process by means of numerical simulation calculation. Recently, ground-based simulation experiments for plasma environment have grabbed growing attention from the country and public. With the advantages of controllable process/parameters, repeatable evolution process as a whole, and multi-point simultaneous measurement, it is of great significance in understanding a variety of physical processes in space plasma as well as the space plasma environment, and in improving human ability to explore the evolution law of space environment.

As one of subsystems of the space environment simulation research infrastructure, the space plasma environment research facility mainly focuses on plasma in the space environment factors, with an aim to reveal the law of distribution and evolution of space plasma and the physical mechanism of its interaction with a spacecraft, thereby improving the understanding of and control over the space extreme environment. Near-earth space plasma environment simulation system is configured to simulate the environment of earth magnetosphere, which mainly works on the following two research objectives: (1) to study the basic physical process of the space plasma environment, specifically the three-dimensional magnetic reconnection at the magnetopause, so as to deepen the understanding of the space plasma environment and provide theoretical guidance for spacecraft design and safety operation; and (2) to study the characteristics and related physical processes of the extreme space plasma environment, and deepen the understanding of the disastrous space environment such as magnetic storms and high-energy particle storms, so as to provide guidance for improving the high-energy particle radiation belt model, and spacecraft safety evaluation and design. In order to achieve the foregoing research objectives, the near-earth space plasma environment simulation system uses a total of 18 coils of 7 types to realize the magnetic field environment of the earth magnetosphere. The 7 types of coils are magnetosheath poloidal field coil, magnetosheath toroidal field coil, magnetopause configuration control coil, dipole field coil, magnetic disturbance type-I coil, magnetic disturbance type-II coil, and magnetic-mirror field coil, which are respectively marked as PF, TF, CK, OJC, CRD I, CRD II and CJC for ease of expression. Among these coils, coil PF includes 4 sub-coils, namely PF-A, PF-B, PF-C and PF-D; coil TF includes 4 sub-coils, namely TF-A, TF-B, TF-C and TF-D; coil CK coil includes 6 sub-coils, namely CK-A, CK-B, CK-C, CK-D, CK-E, and CK-F, and coils OJC, CRD I, CRD II and CJC each include one coil. The 18 coils are excited with current from a pulsed power supply system, each receiving power from respective pulsed power supply. The pulsed power supplies, when marked in the same way as the coils do, include power supply PF-A, power supply PF-B, . . . , and power supply CJC. All of the 18 sets of pulsed power supplies adopt modular design, that is, each set of pulsed power supply includes several modules, and the number of modules for use is changeable, which allows for the adjustable output current waveform, improved maintenance efficiency, as well as disperse energy storage for reduced risk.

SUMMARY

An objective of the present disclosure is to enable pulsed power supplies to provide 18 coils with stable and reliable excitation current featuring multiple output time sequences and flexible adjustability, such that a near-earth space plasma environment ground-based simulation device can be used for simulating the magnetic field of the earth magnetosphere. To achieve the objective, the present disclosure provides a data acquisition and control system of pulsed power supply for multi-load.

The data acquisition and control system of pulsed power supply for multi-load according to the present disclosure has the following advantages: 1) the system can control 18 sets of pulsed power supplies to provide 18 coils with stable and reliable excitation current featuring multiple output time sequences and flexible adjustability, such that magnetic field topologies meeting the requirements of physical experiments are generated through the 18 coils; 2) the system can select the number of pulsed power supplies for use and provide excitation current for the corresponding coils, thus generating magnetic field topologies of different types; 3) after selecting the pulsed power supplies for use, the system can further select the modules for use, such that the corresponding coils of the pulsed power supplies can be energized with more abundant excitation current, thus resulting in more diverse magnetic field topologies; 4) the system can set the trigger discharge time sequences for the pulsed power supplies which have been selected for use, and provide the corresponding coils with excitation power supplies featuring different time sequences, so as to simulate the background magnetic field under a variety of physical experimental conditions; and 5) apart from the features of controlling the charge and discharge of the pulsed power supplies, selecting the power supplies for use, setting the delay trigger, and displaying the voltage of each module of the power supply, the status of key components, and output current waveform, the system can further achieve failure alarm and failure handling operation to ensure the safety of equipment and personnel.

BRIEF DESCRIPTION OF THE DRAWINGS

FIG. 6 shows an operation and display interface of a data storage system;

where

DETAILED DESCRIPTION OF THE EMBODIMENTS

Figure 1:
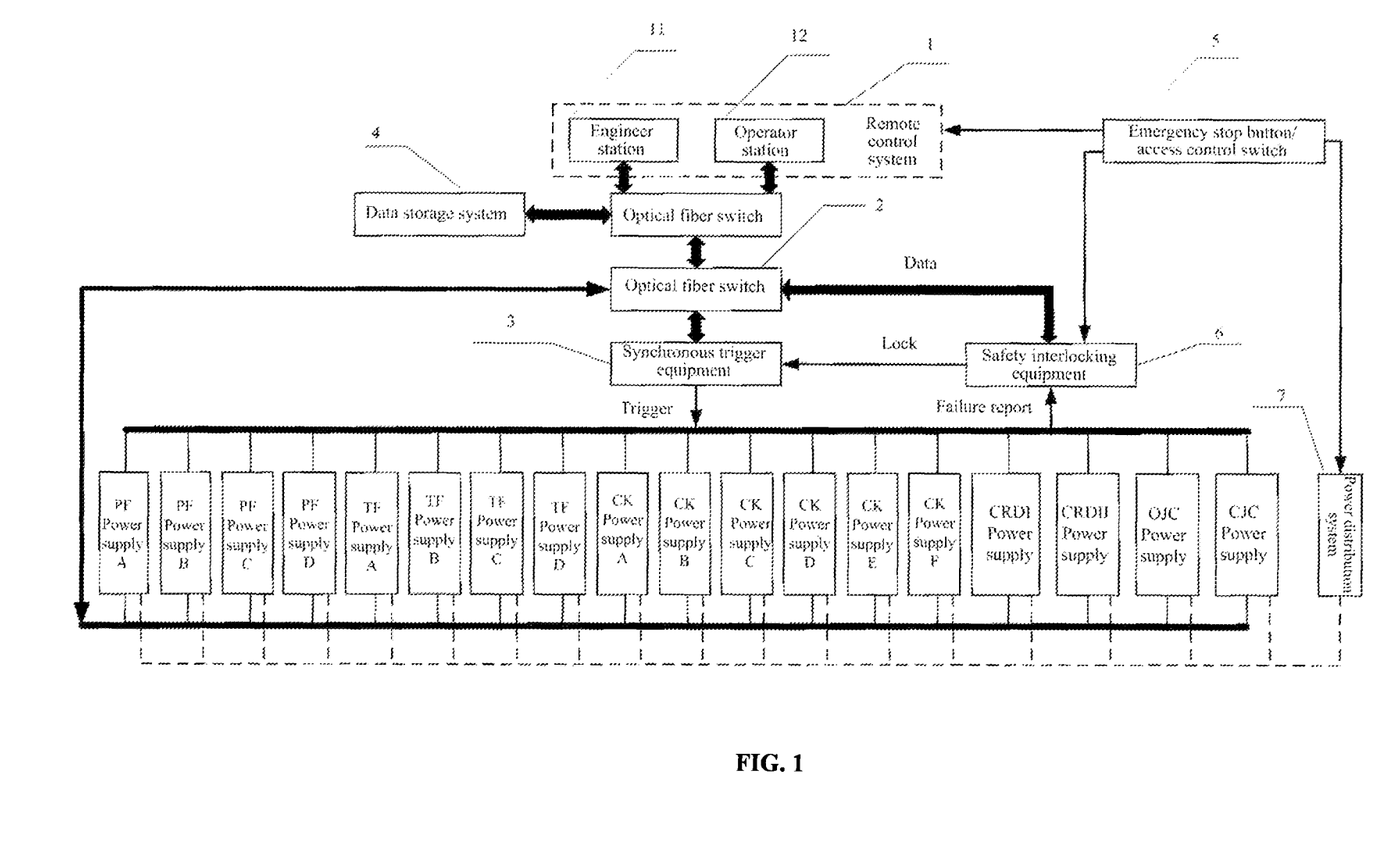
FIG. 1 is a schematic diagram illustrating topologies of a data acquisition and control system of pulsed power supply for multi-load.

Specific Implementation 1: with reference to FIG. 1, this Implementation adopts the following technical solution:

A data acquisition and control system of pulsed power supply for multi-load for a near-earth space plasma environment ground-based simulation device, including a remote control system 1 (including an engineer station 11 and an operator station 12), a data storage system 4, optical fiber switches 2, synchronous trigger equipment 3, safety interlocking equipment 6, an emergency stop button/access control switch 5, a local control unit of each set of pulsed power supply, and a module control unit of each discharge module.

The remote control system 1 (including the engineer station 11 and operator station 12) and the data storage system 4 that are disposed in a control room are connected with the optical fiber switch 2 of the control room through optical fiber; the synchronous trigger equipment 3, the safety interlocking equipment 6, and the local control unit of each set of pulsed power supply that are disposed in a power supply room are connected with the optical fiber switch 2 disposed in the power supply room by optical fiber; discharge modules and chargers are connected with the local control unit of the corresponding pulsed power supply by optical fiber, and the optical fiber switch 2 of the control room is connected with the optical fiber switch 2 of the power supply room by optical fiber.

The remote control system 1 achieves the following functions: control over charge and discharge of pulsed power supplies, selection of power supplies for use, "delay trigger" setting, voltage monitoring, status monitoring of key components and output current display; and it is also necessary to realize failure alarm and failure handling for the purpose of ensuring the safety of equipment and personnel.

The remote control system 1 includes an engineer station 11 and an operator station 12, where the engineer station 11 is configured to set a pulsed power supply for use and the quantity of modules of the power supply, set a time sequence of current output for each module, and set upper temperature limits of dump resistors and crowbar resistors inside discharge modules of each set of power supply and a sampling interval of data acquisition, and proceeding to next discharging operation of the power supply is not allowed only after temperatures of the dump resistors and the crowbar resistors after each power discharge are within the set upper limits.

The operator station 12 is configured to further select the pulsed power supply for use, further control the charge, discharge and dump of the power supply, set charging voltage and trigger time sequence of the power supply put in operation, and display real-time voltage of the power supply, real-time temperature of the crowbar resistors, real-time temperature of the dump resistors, the status of a local control unit, the status of the synchronous trigger equipment, the status of the safety interlocking equipment 6, operation status of the power supply, and status parameters of other key components. In case of failure, the remote control system 1 receives a protection signal sent by the safety interlocking equipment 6, and sends an instruction of stopping charging and performing dump to the local control unit, and each module turns off a charging switch and turns on a dump switch, such that the energy of the power supply can be safely and quickly released.

The data storage system 4 is configured to store data about each discharge of the pulsed power supplies, and permits querying the data of any of the discharge.

The optical fiber switches 2 are configured to connect the remote control system 1, the data storage system 4, the synchronous trigger equipment 3, the safety interlocking equipment 6, and the local control unit of each set of pulsed power supply. The control room and the power supply room each have one optical fiber switch 2, and the two optical fiber switches 2 are connected by optical fiber to prevent electromagnetic interference.

The synchronous trigger equipment 3 is configured to receive various time sequence parameters and instructions sent by the remote control system 1, and send a trigger signal to the local control unit of the pulsed power supply for use according to a specific time sequence. The synchronous trigger equipment is also configured to receive a protection signal sent by the safety interlocking equipment 6 in case of failure, so as to lock the synchronous trigger equipment 3, and prohibit the synchronous trigger equipment from transmitting the trigger signal.

The safety interlocking equipment 6 is configured to receive a failure signal reported by the local control unit of each set of pulsed power supply in case of failure during the operation of the pulsed power supply system, a press signal of the emergency stop button in a control room, and an opening signal of the access control switch of the power supply room, and when receiving any of the above signals, the safety interlocking equipment 6 outputs a protection signal to the synchronous trigger equipment 3 and the remote control system 1, such that the function of discharge triggering of the synchronous trigger equipment 3 is locked, the remote control system 1 sends an instruction of stopping charging and performing dump to each local control unit, and each module turns off the charging switch and turns on the dump switch to safely and rapidly release energy of each power supply.

The emergency stop button is located in the control room, and is pressed in case of a failure or other emergency in a charging process of the pulsed power supply system, so as to send an emergency stop signal to the remote control system 1, the power distribution system 7 and the safety interlocking equipment 6. Then the remote control system 1 shows an abnormal status, the power distribution system 7 automatically disconnects from each set of power supply, the safety interlocking equipment 6 locks trigger action of the synchronous trigger equipment 3, and at this time, discharge operation of the power supply is disabled; meanwhile, the remote control system 1 sends action instructions to a local control unit of each power supply, and the module of each set of power supply automatically turns off the charging switch to stop a charger from charging the discharge module, and automatically turns on the dump switch to dump the energy of each module.

The access control switch is located at the entrance of the power supply room. Normally, a door of a power supply room should be closed and no person is allowed to enter the power supply room during the operation of the pulsed power supply system; however, when the door of the power supply room is opened accidentally, the access control switch sends an "access control breaking" signal to the remote control system 1, the power distribution system 7 and the safety interlocking equipment 6; then the remote control system 1 shows an abnormal status, the power distribution system 7 automatically disconnects from each set of power supply, the safety interlocking equipment 6 locks the triggering action of the synchronous trigger equipment 3, and at this time, discharge operation of the power supply is disabled; meanwhile, the remote control system 1 sends action instructions to a local control unit of each power supply, and the module of each set of power supply automatically turns off the charging switch to stop the charger from charging the discharge module, and automatically turns on the dump switch to release the energy of each module.

The local control unit of each set of pulsed power supply achieves the functions of: receiving various parameters and instructions sent by the remote control system 1, issuing parameters and instructions to each module, receiving acquired data about voltage, crowbar current and temperature and working status uploaded by each module, collecting data about coil voltage and output current of power supplies, blending various data and statuses for storage, transmitting to the remote control system 1 according to corresponding requirements, reporting a failure signal to the safety interlocking equipment 6, and reporting failure information to the remote control system 1.

The module control unit of each module is configured to communicate with the local control unit, receive the parameters and instructions issued by the local control unit, judge the failure of the key components in the discharge module and upload the failure data to the remote control system 1 through the local control unit; and monitor the temperatures of the crowbar resistors and dump resistors through a temperature sensor and upload the parameter data, and measure and upload crowbar current and voltage of the discharge module.

The system of the present disclosure is configured to control 18 sets of pulsed power supplies to provide 18 coils with stable and reliable excitation current featuring multiple output time sequences and flexible adjustability, such that a near-earth space plasma environment ground-based simulation device can simulate the magnetic field topology of the earth magnetosphere and realize a background magnetic field required by physical experiments. The system mainly achieves the following functions: control over charge and discharge of pulsed power supplies, selection of power supplies put in use, "delay trigger" setting, voltage monitoring, status monitoring of key components and output current display; and it is also necessary to realize failure alarm and failure handling for the purpose of ensuring the safety of equipment and personnel.

Specific Implementation 2: this Implementation is intended to further illustrate Implementation 1. In this Implementation, chargers and discharge modules included in 18 sets of power supplies are all supplied by the power distribution system 7, and when a failure occurs during the operation of a pulsed power supply, the power supply of the power distribution system 7 can be cut off by pressing an emergency stop button, such that the safety of system and personnel is guaranteed; in addition, during the operation of the pulsed power supply, opening of the access control switch may also cut off the power supply of the power distribution system 7. The locking function of the safety interlocking equipment 6 and the protection function of automatically stopping charging and performing dump of the pulsed power supplies can be triggered in both cases.

Figure 2:
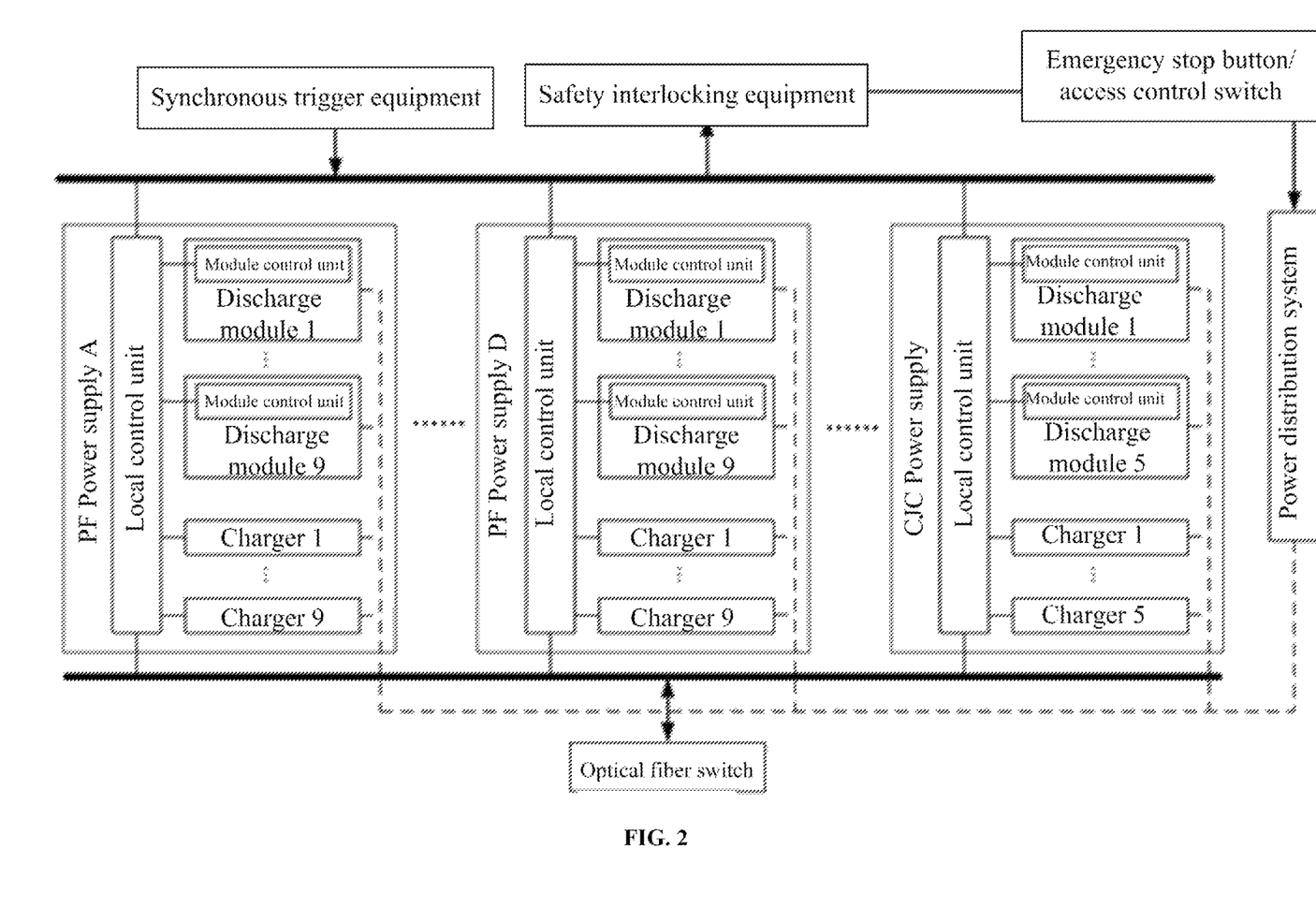
FIG. 2 is a structural schematic diagram of each set of pulsed power supply in a data acquisition and control system of pulsed power supply for multi-load, where the labels of each set of pulsed power supply in FIG. 2 are the same as those in FIG. 1, with some omissions in the middle. In addition, the quantities of modules corresponding to the pulsed power supplies are as follows: 9 modules in power supply PF, 4 modules in power supply TF, 10 modules in power supply CK, 10 modules in power supply OJC, 2 modules in power supply CRD I, 5 modules in power supply CRD II, and 5 modules in power supply CJC.

FIG. 2 is a structural schematic diagram of each set of pulsed power supply in a data acquisition and control system of pulsed power supply for multi-load. As shown in FIG. 2, the pulsed power supplies have a total of 18 local control units with the same functions. The discharge modules have a total of 134 module control units with the same functions.

The 18 sets of pulse power supplies include 4 sets of power supplies PF, 4 sets of power supplies TF, 6 sets of power supplies CK, 1 set of power supply CRD I, 1 set of power supply CRD II, 1 set of power supply OJC, and 1 set of power supply CJC.

The pulsed power supplies have the same structure, each including 1 local control unit, one charger group and a discharge module group.

There are 9 chargers in the charger group of each set of power supply PF, 4 in the charger group of each set of power supply TF, 10 in the charger group of each set of power supply CK, 2 in the charger group of power supply CRD I, 5 in the charger group of power supply CRD II, 10 in the charger group of power supply OJC, and 5 in the charger group of power supply CJC. All chargers are connected with the local control unit of the pulsed power supply by using optical fiber, so as to receive control instructions and upload status parameters.

There are 9 discharge modules in the discharge module group of each set of power supply PF, 4 in the discharge module group of each set of power supply TF, 10 in the discharge module group of each set of power supply CK, 2 in the discharge module group of power supply CRD I, 5 in the discharge module group of power supply CRD II, 10 in the discharge module group of power supply OJC, and 5 in the discharge module group of power supply CJC. The functions of control and data acquisition of each discharge module are realized by the module control unit located inside the discharge module, the module control unit being connected with the local control unit of the pulsed power supply by using optical fiber, so as to receive control instructions and upload status parameters.

In order to meet the function of time sequence trigger of each set of pulsed power supply, the synchronous trigger equipment 3 is used to receive the time sequence parameters set by the remote control system 1, and then issue the parameters to the local control unit of each set of pulsed power supply. With other control instructions such as voltage setting, charging, dump and other functions, as well as the display of status parameters, each set of pulsed power supply communicates directly with the remote control system 1 through the optical fiber switch 2. When failure occurs during the operation of a pulsed power supply, failure information is uploaded to the remote control system 1 through the safety interlocking equipment 6, meanwhile, the safety interlocking equipment 6 locks the synchronous trigger equipment 3 to stop the synchronous trigger equipment from executing a trigger instruction and then avoid harm to personnel and equipment caused by discharge trigger in case of failure; moreover, instructions of stopping charging and performing dump actions are transmitted to the local control unit, thus achieving safe dump of energy of the power supply. The operation data of each pulsed power supply will be stored in the data storage system 4 and can be referred to for view.

Figure 3:
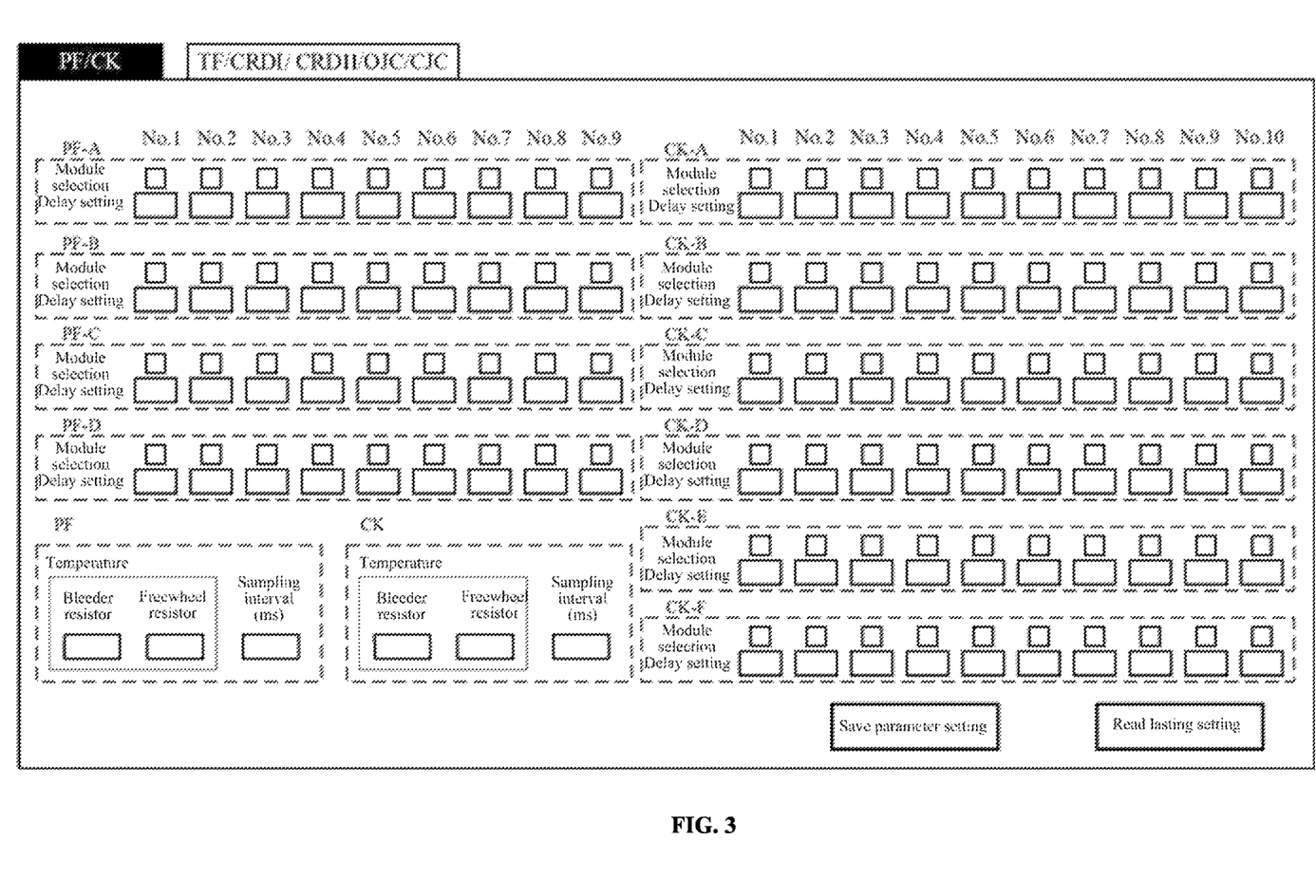
FIG. 3 is a schematic diagram illustrating an interface of an engineer station in a remote control system.

FIG. 3 shows an interface set for the engineer station in the remote control system. Due to interface limitations, all power supplies are shown in two pages, where in the upper part of the interface is the label page of power supply selection, power supplies PF and CK are on one page, and the remaining power supplies are on the other page. Take the page of PF and CK as example, the interface mainly includes the selection of power modules and delay setting. Below is the setting of upper temperature limits and setting of parameter sampling interval for the dump resistors and crowbar resistors of all modules in the power supplies checked for use. Prior to the use of the pulsed power supplies, it is necessary to select and check the power supplies and modules for use in the interface of the engineer station, and then set the upper temperature limits of the dump resistors and crowbar resistors and the parameter sampling intervals; after all the parameters are set, the parameter configuration is completed through the "save parameter setting" button at the lower part and sent to the operator station 12; through the "read the last parameter setting" button, the last parameter configuration can be read, and sent to the operator station 12. The interface of TF/CRD I/CRD II/OJC/CJC power engineer station is the same as that of PF and CK power engineer station.

Figure 4:
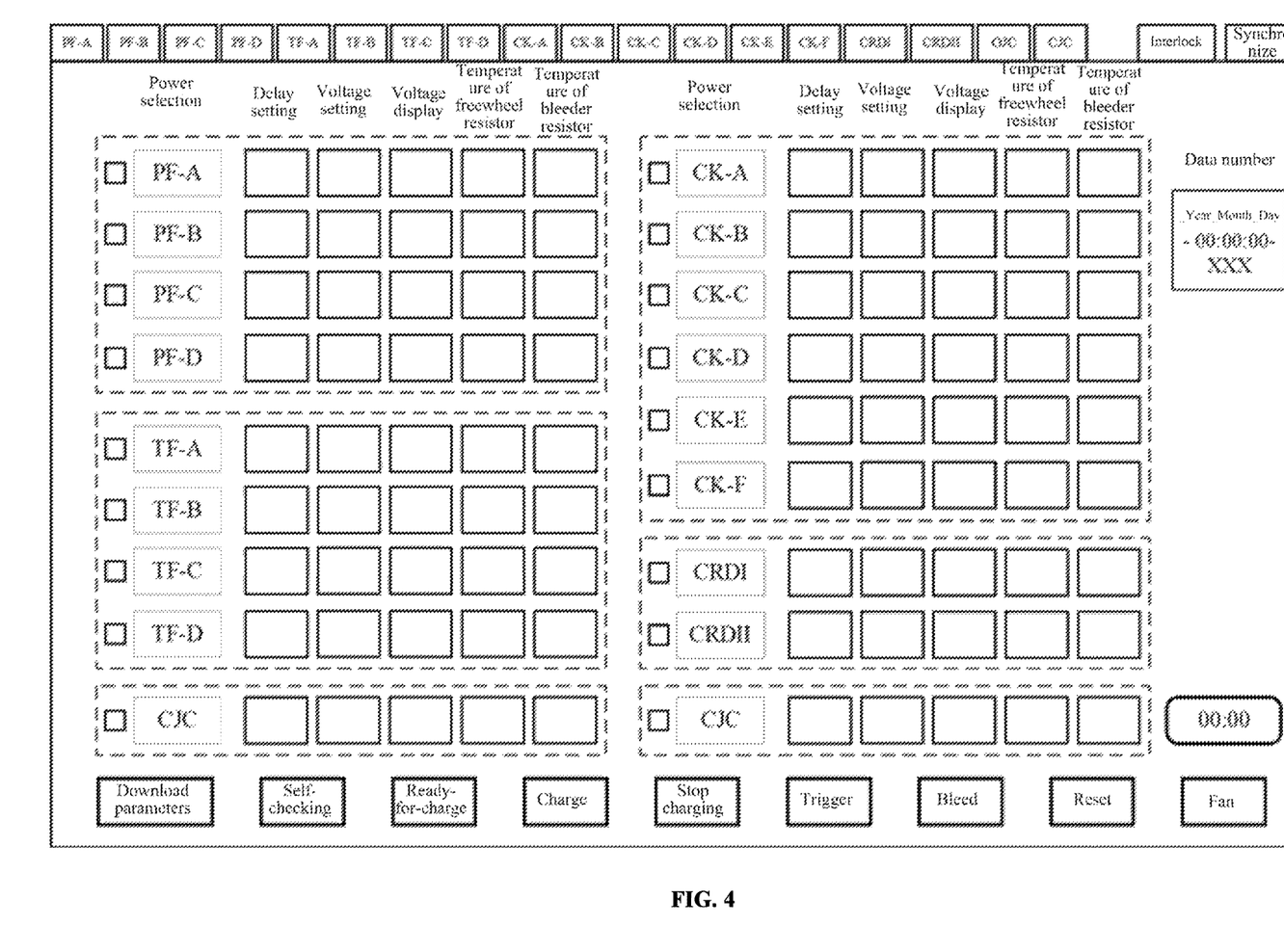
FIG. 4 is a schematic diagram illustrating an interface of an operator station in a remote control system.

FIG. 4 shows an interface set for the operator station in the remote control system 1, where in the upper part is the total status parameter display labels of 18 sets of pulsed power supplies, safety interlocking equipment 6 and synchronous trigger equipment 3, all of which represent the current status information by colors, including: red (failure), green (normal status), gray (disconnection), and blue (command feedback). The main part of the interface is the setting interface for 18 sets of pulsed power supplies, including the selection of power supplies put in operation, the setting of trigger delays, the setting of charging voltage, the real-time display of the current voltage of the power supplies (showing the supply voltage of the discharge module with the lowest voltage in the current power supply), and the display of the temperatures of dump resistors and crowbar resistors. After all the parameters are set, the configured parameters are issued to the chargers and discharge modules through the local control unit of each power supply by pressing a "download parameters" button below. The lower part of the interface involves the control functions of the whole pulsed power supply, including a self-checking function of checking whether each set of power supply for use is in a normal status, a ready-for-charge function of turning on a charging relay, a charging function of enabling recharge of chargers, a stop-charging function of disconnecting the charging relay when necessary (normally, the charging relay is automatically disconnected after charging to the set voltage), a trigger function of enabling the discharge switch to execute the short-circuit command and thus realize power supply discharge, a dump function of releasing residual voltage of the power supply, that is, turning on the dump switch, a reset function of restoring the power supply to the initial status before self-checking after completing a discharge operation, and a countdown function during each discharge operation. Before each trigger discharge process, the system will generate the data number by default at the upper right corner, which facilitates data search and reading.

Figure 5:
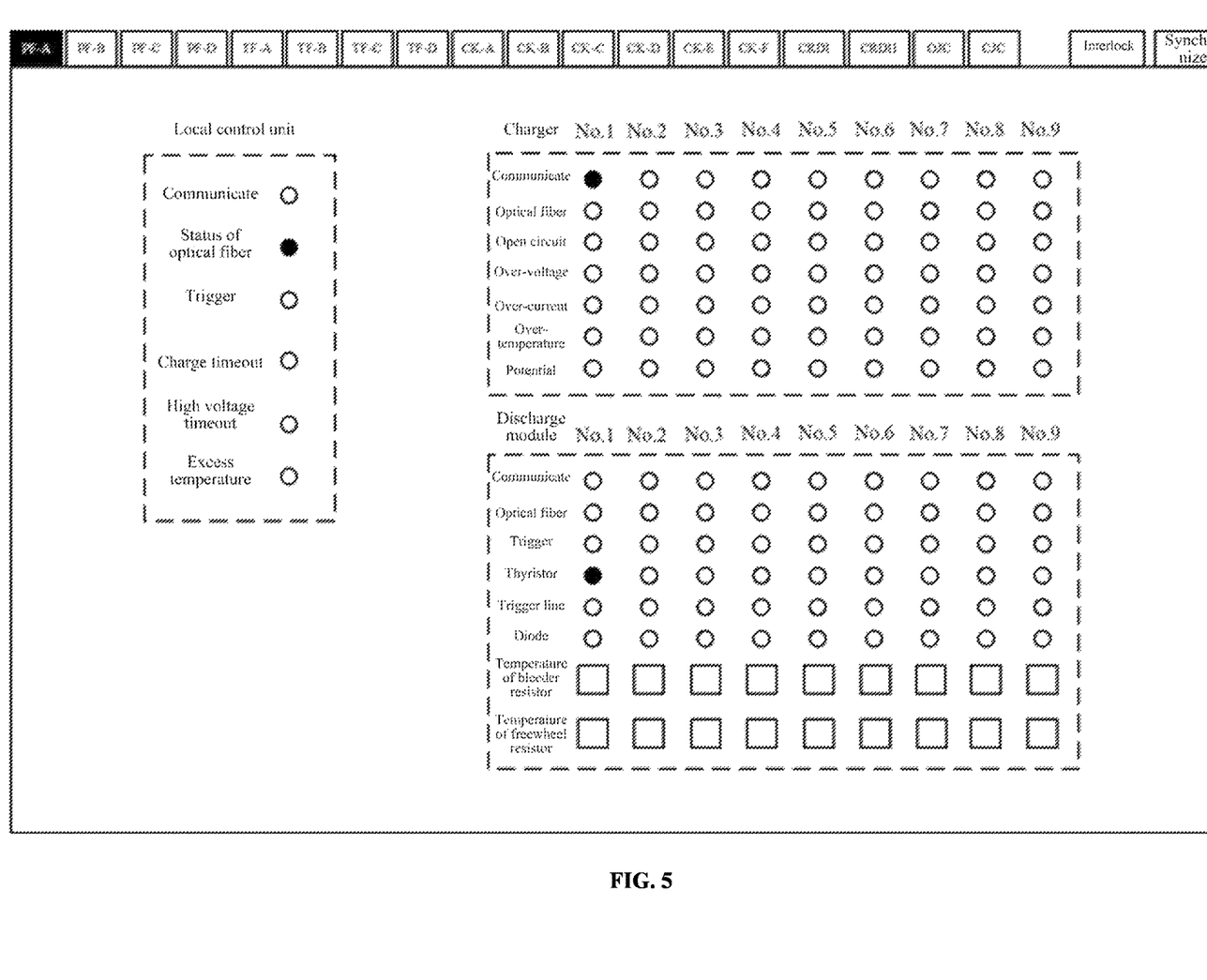
FIG. 5 is a schematic diagram illustrating a status display interface of an operator station in a remote control system.

The detailed status of each set of pulsed power supply is displayed by clicking the total status parameter display label. Take the power supply PF-A as an example, as shown in FIG. 5, the left side of the interface shows failure in communication status, failure in fiber joining status, trigger failure, failure in charge timeout, failure in high voltage timeout, and failure in excess temperature occurring between the local control unit of the current power supply and the remote control system 1. For example, when the connection fiber status failure occurs, a status indicator lamp lights up. The upper part of the interface shows the communication status failure, failure in fiber joining status, failure in charger open-circuit, overvoltage failure, overcurrent failure, over-temperature failure, and potential imbalance failure occurring between each charger in the current power supply and the remote control system 1. For example, when the communication status failure occurs between the charger and the remote control system 1, the status indicator lamp lights up. The lower part of the interface shows the communication status failure, failure in fiber joining status, trigger failure, voltage-sharing failure in thyristor assemblies, failure in trigger lines connected with each thyristor in the thyristor assembly, voltage-sharing failure in diode assemblies, failure in temperatures of dump resistors and crowbar resistors occurring in each discharge module in the current power supply and the remote control system 1. When voltage-sharing failure in thyristor assemblies occurs, the status indicator lamp lights up. In the detailed status display interface of other power supplies, the number of status display columns of the chargers and discharge modules corresponds to the actual number of chargers and discharge modules.

FIG. 6 shows the operation interface of the data storage system 4, which is divided into two label interfaces, namely the data overview interface and the power data interface.

Figure 6A:
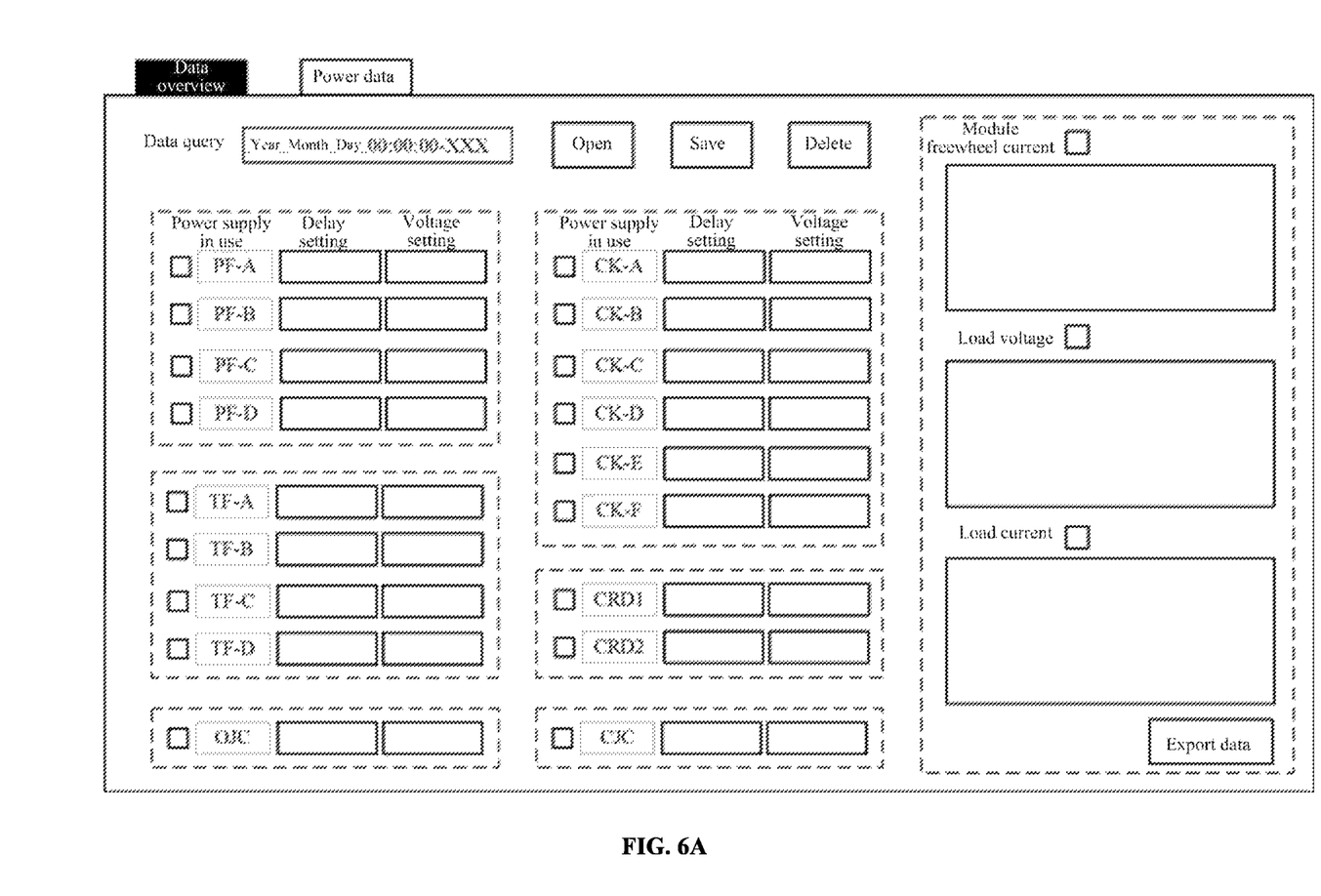
FIG. 6A shows a data query and data overview interface of the data storage system.

FIG. 6A shows the data overview interface. In this interface, one may query required data according to the operation sequence number by year, month, and day, and display the main parameters of the pulsed power supply currently queried regarding the operation status, including the power supply in use, delay setting and voltage setting. The right side of the interface displays output current waveforms, load voltage waveforms, and module crowbar current waveforms of the power supply for use, and the current waveforms and voltage waveforms can be exported to other data formats for view by other tools. In addition to the query operation, the target file can be opened directly by an "open" button, and the save location can be changed by a "save" button. If the queried or opened file is useless, the file data can be deleted by a "delete" button.

Figure 6B:
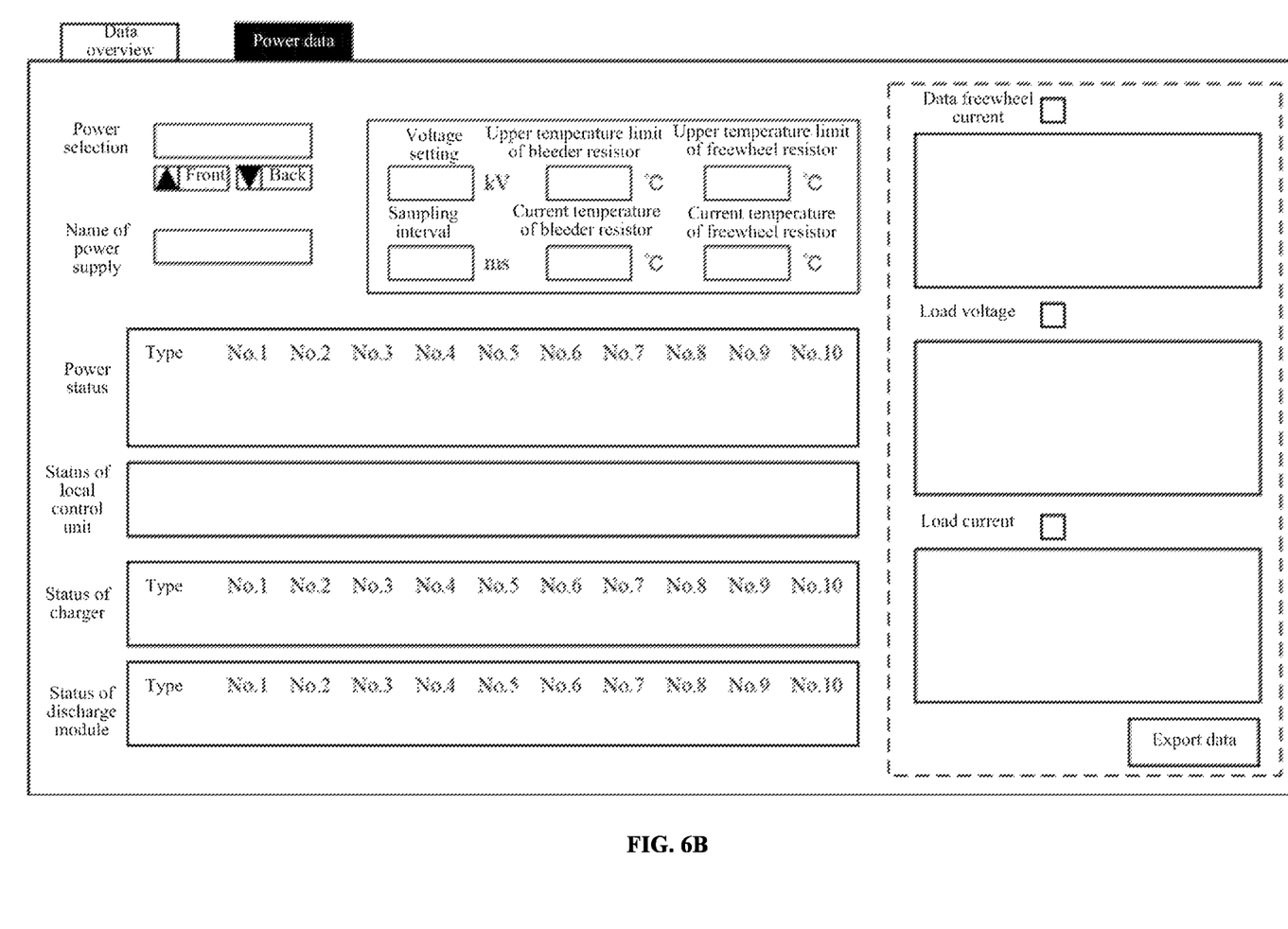
FIG. 6B shows a data detail display interface of the data storage system.

FIG. 6B shows the power data interface. In this interface, one can view the detailed data of a specific set of power supply in the currently queried pulsed power supplies, and view a specific set of power supply through "power selection", where the "name of power supply" shows the label of the power supply currently queried, displayed at the right side is the parameter setting information, the information about power status, status of the local control unit, status of chargers and the status of discharge modules is displayed below, and displayed in the right side are the output current waveforms, load voltage waveforms, and module crowbar current waveforms of the power supply currently queried. The power status includes information about module use, module trigger delay, and temperatures of dump resistors and crowbar resistors. The information about the status of local control unit, the status of chargers and the status of discharge modules includes all the information as shown in FIG. 5.

Figure 7:
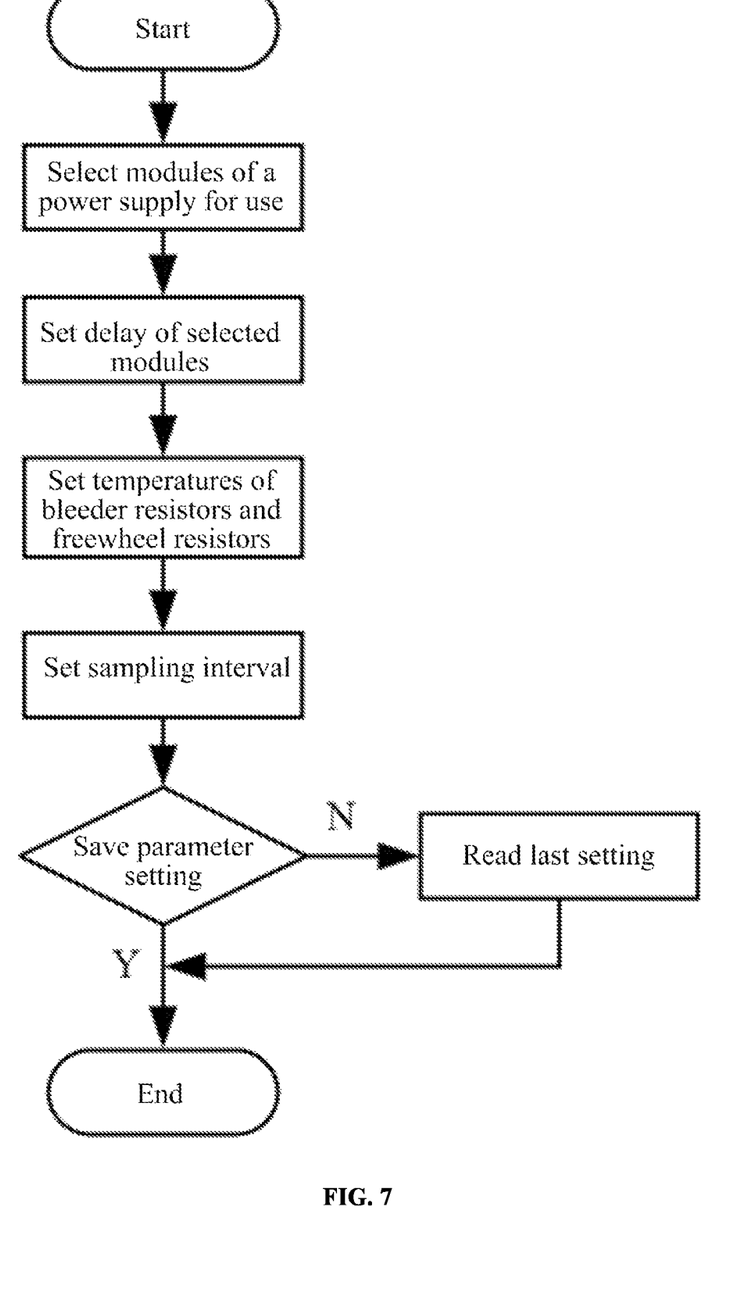
FIG. 7 shows an operational flowchart of an engineer station in a remote control system.

FIG. 7 shows an operational flowchart of the engineer station 11 in the remote control system 1. The operational flowchart includes: firstly, select the power module that needs to be put into operation, and set the trigger delay; then set the upper temperature limits of the dump resistors and crowbar resistors and the data sampling interval; finally, save the parameter settings, at this time, the saved setting parameters will be sent to the operator station 12, and the operator station 12 completes the detailed setting of other parameters of the power supply according to the settings of the engineer station 11. When "read the last setting" is clicked, the parameters set by the engineer station 11 last time will be sent to the operator station 12 for detailed settings of other parameters of the power supply.

Figure 8:
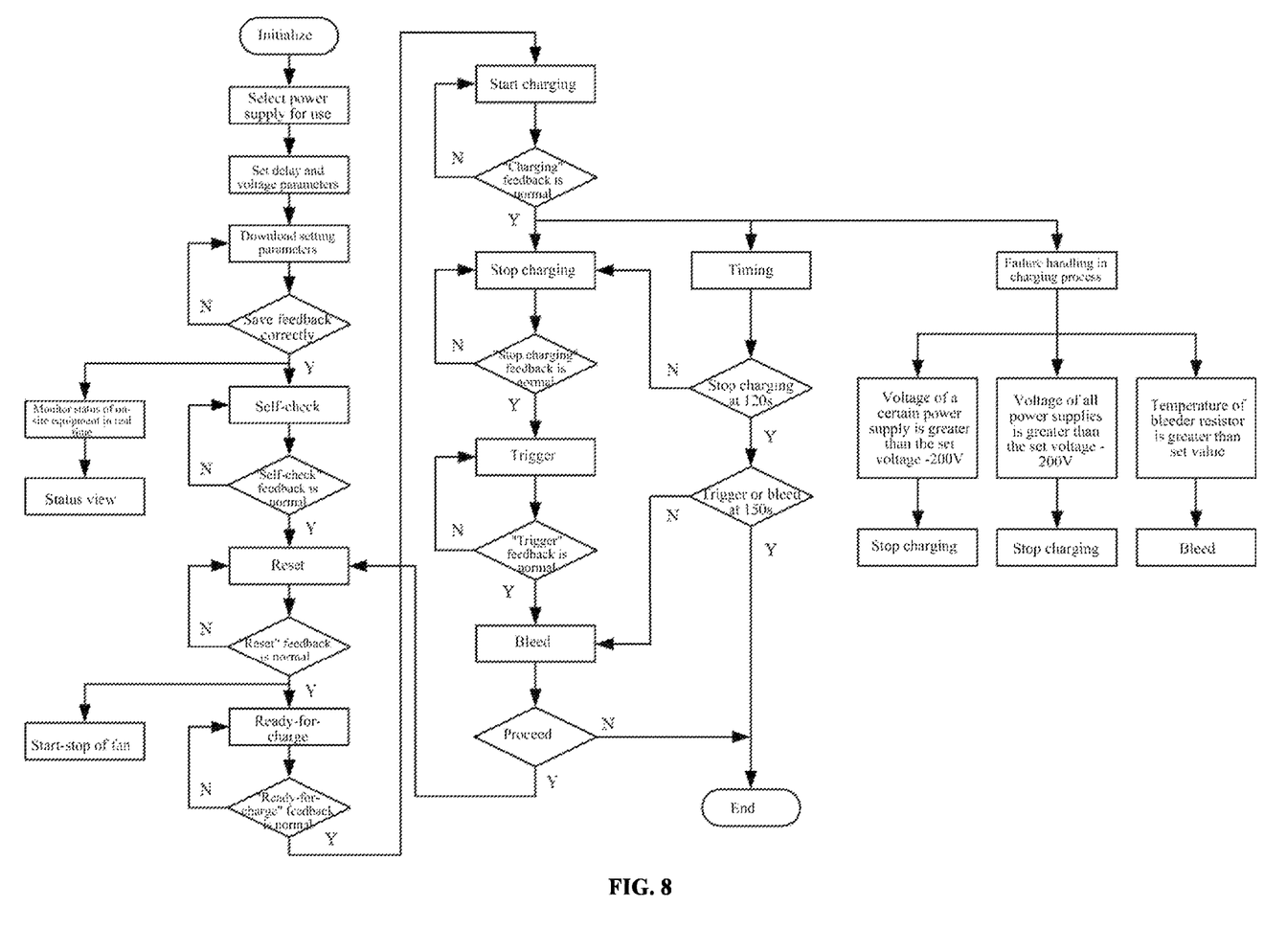
FIG. 8 shows an operational flowchart of an operator station in a remote control system.

FIG. 8 shows an operational flowchart for the complete discharge trigger of the operator station in the remote control system. The operational flowchart includes: firstly, select the power supply that needs to be put into operation and set the trigger delay and charging voltage; proceed to the next step after all the setting parameters are downloaded to the local control unit, and at this time, one can view the detailed status information by clicking the total status parameter display label. When there is no problem, click the "self-checking" button to check whether the trigger function, safety interlocking function and synchronous trigger function of the power supply put into operation are normal. The total status parameter label showing blue indicates that the power supply feedback to the self-checking command is normal; while the total status parameter label showing red indicates that failure occurs and it is required to resolve the problem prior to the next step. After the self-checking procedure shows all things run normally, click "reset" to restore the power supply to the initial status, and after a normal feedback is given, one can start the discharge operation. First, click on the "ready-for-charge" button, turn on the charging relay, then complete prepare-for-charging actions, then click "start to charge" button such that the charger starts to execute the command of charging the power supply, and the timing function is enabled to start the 150s countdown; and after the voltage on the power supply reaches the set value, the "stop charging" command can be automatically completed; at this time, the charging relay is disconnected, or the "stop charging" command is executed automatically after the charging process has been carried out for 120s. If necessary, one can manually click "stop charging" button to execute the "stop charging" command. If a failure occurs during the charging process, one may execute the "stop charging" command or the "dump" command of turning on the dump switch depending on difference failure conditions. After charging is finished, click "short circuit" operation of triggering execution of a discharge switch, that is, a pulsed power supply discharges, and it is required to click the "dump" button to execute action of releasing remaining energy on the power supply after triggering is finished. When necessary, it is possible to skip the triggering action and directly click "dump" button to release energy stored on the power supply. In addition, the "dump" action is automatically executed after 150s countdown. Described above is the whole operational flowchart of controlling discharge trigger of the pulsed power supply of the operator station in the remote control system. When it is required to continue operation, one can repeat the operational flow following the reset.

The present disclosure is described with reference to several specific embodiments, and those skilled in the art should understand that various changes or equivalent substitutions may be made to the present disclosure without departing from the scope of the present disclosure. In addition, various modifications can be made to the present disclosure according to specific situation or circumstance without departing from the scope of the present disclosure. Therefore, the present disclosure is not limited to the specific embodiments disclosed herein, but should include all of the implementations falling within the scope of the present disclosure.

What is claimed is:

1. A data acquisition and control system of pulsed power supply for multi-load, wherein the data acquisition and control system of pulsed power supply for multi-load is a pulsed power supply data acquisition and control system configured to connect to a near-earth space plasma environment ground-based simulation device, and wherein a pulsed power supply of the near-earth space plasma environment ground-based simulation device comprises a power distribution system (7) and 18 sets of power supplies, the power distribution system (7) being configured to supply power to the 18 sets of power supplies at the same time;

the data acquisition and control system of pulsed power supply for multi-load comprises a remote control system (1), two optical fiber switches (2), synchronous trigger equipment (3), an emergency stop button/access control switch (5), and safety interlocking equipment (6);

the remote control system (1) comprises an engineer station (11) and an operator station (12);

the engineer station (11) is configured to:
  set the pulsed power supply for use,
  set the quantity of modules of the pulsed power supply,
  set a time sequence of current output for each power module, and
  set upper temperature limits of dump resistors and crowbar resistors inside discharge modules of each set of power supply, and a data acquisition sampling interval of data acquisition, wherein proceeding to next discharging operation of the power supply is not allowed only after temperatures of the dump resistors and the crowbar resistors after each power discharge are within the set upper limits;
the operator station (12) is configured to:
  select the pulsed power supply for use,
  further control the charge, discharge and dump of the power supply,
  set charging voltage and trigger time sequence of the power supply put in operation, and
  display real-time voltage of the power supply, real-time temperature of the crowbar resistors, real-time temperature of the dump resistors, the status of a local control unit, the status of the synchronous trigger equipment, the status of the safety interlocking equipment, operation status of the power supply, and status parameters,
wherein in case of failure:
  the remote control system:
    receives a protection signal sent by the safety interlocking equipment, and
    sends an instruction of stopping charging and bleeding to the local control unit, and
    each module turns off a charging switch and turns on a dump switch, such that the energy of the power supply can be safely and quickly released,
  the two optical fiber switches are connected by optical fiber to prevent electromagnetic interference, and the two optical fiber switches are connected and are data exchange equipment for the remote control system (1), a data storage system (4), the synchronous trigger equipment (3) and the safety interlocking equipment (6);
  the synchronous trigger equipment (3) is configured to;
    receive various time sequence parameters and instructions sent by the remote control system (1), and
    send a trigger signal to the local control unit of the pulsed power supply according to a specific time sequence; and
    receive a protection signal sent by the safety interlocking equipment (6) in case of failure, so as to lock the synchronous trigger equipment (3), and prohibit the synchronous trigger equipment from transmitting the trigger signal;
  an emergency stop button in the emergency stop button/access control switch (5) is pressed in case of a failure or other emergency in a charging process of the pulsed power supply system, so as to:
    send an emergency stop signal to the remote control system (1), the power distribution system (7) and the safety interlocking equipment (6);
    wherein responsive to the emergency stop signal:
      the remote control system (1) shows an abnormal status,
      the power distribution system (7) automatically disconnects from each set of power supply,
      the safety interlocking equipment (6) locks trigger action of the synchronous trigger equipment (3), and
      at this time, discharge operation of the power supply is disabled;
      wherein, concurrently with the remote control system showing abnormal status, the remote control system (1) sends action instructions to a local control unit of each power supply, and the module of each set of power supply automatically turns off the charging switch to stop a charger from charging the discharge module, and automatically turns on the dump switch to release the energy of each module;
  an access control switch in the emergency stop button/access control switch (5) is configured to close a door of a power supply room no person to enter the power supply room during normal operation of the pulsed power supply system, and send an "access control breaking" signal to the remote control system (1), the power distribution system (7) and the safety interlocking equipment (6) when the door of the power supply room is opened accidentally; then:
    the remote control system (1) shows an abnormal status,
    the power distribution system (7) automatically disconnects from each set of power supply,
    the safety interlocking equipment (6) locks the triggering action of the synchronous trigger equipment, and
    concurrently with the locking, discharge operation of the power supply is disabled;
    the remote control system (1) sends action instructions to a local control unit of each power supply, and
    the module of each set of power supply automatically turns off the charging switch to stop the charger from charging the discharge module, and automatically turns on the dump switch to release the energy of each module; and
  the safety interlocking equipment (6) is configured to receive:
    a failure signal reported by the local control unit of each set of pulsed power supply in case of power failure during the operation of the pulsed power supply system,
    a press signal of the emergency stop button in a control room, and
    an opening signal of the access control switch of the power supply room,
    wherein, when receiving any of the failure signal, press signal, and opening signal, the safety interlocking equipment outputs a protection signal to the synchronous trigger equipment and the remote control system, such that the function of discharge triggering of the synchronous trigger equipment is locked, wherein the remote control system (1) sends an instruction of stopping charging and performing dump to each local control unit, and wherein each module turns off the charging switch and turns on the dump switch to safely and rapidly release energy of each power supply.

2. The data acquisition and control system of pulsed power supply for multi-load according to claim 1, wherein the data acquisition and control system of pulsed power supply for multi-load further comprises a data storage system (4); wherein the data storage system (4) is configured to store data about each discharge of the pulsed power supplies, and permit querying the data of one of the discharges.

3. The data acquisition and control system of pulsed power supply for multi-load according to claim 1, wherein the local control unit of each set of pulsed power supply is configured to perform operations comprising receiving various parameters and instructions sent by the remote control system, issuing parameters and instructions to each module, receiving acquired data about voltage, crowbar current and temperature and working status uploaded by each module, collecting data about coil voltage and output current of power supplies, blending various data and statuses for storage, transmitting to the remote control system (1) according to corresponding requirements, reporting a failure signal to the safety interlocking equipment (6), and reporting failure information to the remote control system (1).

4. The data acquisition and control system of pulsed power supply for multi-load according to claim 1, wherein the chargers and discharge modules contained in the 18 sets of power supplies are all supplied by the power distribution system (7); when a failure occurs during the operation of the pulsed power supplies, pressing the emergency stop button can cut off the power supply of the power distribution system and ensure the safety of the system and personnel; in addition, during the operation of the pulsed power supplies, the opening of the access switch can also cut off the power supply of the power distribution system; and the locking function of the safety interlocking equipment and the protection function of automatically stopping charging and performing dump of the pulsed power supplies can be triggered in both cases.

\* \* \* \* \*